United States Patent
Goto et al.

(10) Patent No.: US 7,740,272 B2
(45) Date of Patent: Jun. 22, 2010

(54) AIRBAG APPARATUS FOR SMALL VEHICLES

(75) Inventors: Hiroshi Goto, Saitama (JP); Tadatoshi Shigetomi, Saitama (JP); Hisashi Matsuo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 473 days.

(21) Appl. No.: 11/294,506

(22) Filed: Dec. 6, 2005

(65) Prior Publication Data
US 2006/0124376 A1 Jun. 15, 2006

(30) Foreign Application Priority Data
Dec. 10, 2004 (JP) ............... 2004-357739

(51) Int. Cl.
*B60R 21/231* (2006.01)
(52) U.S. Cl. ............... 280/735; 280/728.1; 280/730.1; 280/734
(58) Field of Classification Search ........... 180/271, 180/281, 286; 280/290, 733, 728.1, 730.1, 280/734; 2/102
See application file for complete search history.

(56) References Cited

U.S. PATENT DOCUMENTS

| | | | | |
|---|---|---|---|---|
| 3,930,667 A | * | 1/1976 | Osuchowski et al. ...... | 280/730.1 |
| 4,059,852 A | * | 11/1977 | Crane ....................... | 2/456 |
| 4,685,151 A | * | 8/1987 | Kincheloe ................ | 2/456 |
| 4,825,469 A | * | 5/1989 | Kincheloe ................ | 2/456 |
| 5,746,442 A | * | 5/1998 | Hoyaukin ................ | 280/730.1 |
| 5,781,936 A | * | 7/1998 | Alaloof .................... | 2/456 |
| 6,125,478 A | * | 10/2000 | Alaloof .................... | 2/456 |
| 6,139,050 A | * | 10/2000 | Bultel et al. ............. | 280/730.1 |
| 6,230,333 B1 | * | 5/2001 | Umeda ..................... | 2/463 |
| 6,496,764 B1 | * | 12/2002 | Wang ....................... | 701/45 |
| 6,748,307 B1 | * | 6/2004 | Sala et al. ................. | 701/46 |
| 6,766,535 B2 | * | 7/2004 | Duhamell et al. ........ | 2/102 |
| 7,225,069 B2 | * | 5/2007 | Stuetzler .................. | 701/45 |
| 7,328,464 B2 | * | 2/2008 | Lee .......................... | 2/456 |
| 2006/0192367 A1 | * | 8/2006 | Zumpano ................. | 280/730.1 |

FOREIGN PATENT DOCUMENTS

DE 29521373 U1 4/1997

(Continued)

*Primary Examiner*—Paul N Dickson
*Assistant Examiner*—Karen Jane J Amores
(74) *Attorney, Agent, or Firm*—Birch, Stewart, Kolasch & Birch, LLP

(57) ABSTRACT

An airbag apparatus for a small vehicle for preventing an airbag from being inflated uselessly even when a rider is moved significantly on the vehicle. A first airbag module includes impact sensors, an electronic control unit for generating an output signal when an impact force is determined to be excessive from detection signals supplied from the impact sensors, an inflator which is activated by the output signal from the electronic control unit and an airbag which is inflated by gas generated from the inflator that is mounted on a small vehicle. A second airbag module includes an inflator and a wearing type airbag which is inflated by gas generated by the inflator that is mounted on a rider. The electronic control unit and the inflator of the second airbag module are connected by couplers that can input the output signal from the electronic control unit to the second airbag module.

18 Claims, 4 Drawing Sheets

FOREIGN PATENT DOCUMENTS

| | | |
|---|---|---|
| DE | 19728130 A1 | 1/1999 |
| DE | 19838022 C1 | 5/2000 |
| DE | 10154604 A1 | 6/2003 |
| DE | 10315533 A1 | 11/2003 |
| DE | 10216900 A1 | 3/2004 |
| JP | 9-66780 A | 3/1997 |
| JP | 2002-285408 | 10/2002 |
| JP | 2003-291875 A | 10/2003 |
| JP | 2003-312568 A | 11/2003 |

* cited by examiner

AIRBAG APPARATUS FOR SMALL VEHICLES

CROSS-REFERENCE TO RELATED APPLICATIONS

The present application claims priority under 35 USC 119 to Japanese Patent Application No. 2004-357739 filed on Dec. 10, 2004 the entire contents of which are hereby incorporated by reference.

1. Field of the Invention

The present invention relates to an improved airbag apparatus for a small vehicle as an approach for alleviating an impact against a rider.

2. Description of Background Art

Heretofore, the mounting of an airbag module including an inflator for generating high-pressure gas when it receives an excessive impact and an airbag that is inflated by gas generated from the inflator to alleviate an impact against a rider of a small vehicle such as a motorcycle is disclosed in JP-A-2003-312568. In addition, the mounting of an airbag module including an inflator for generating high-pressure gas when the rider is moved significantly and wears a type of an airbag which is inflated by gas generated from the inflator is disclosed in JP-A-9-66780.

When the rider wears the wearing type airbag disclosed in JP-A-9-66780, a situation may arise wherein the inflator is activated and hence the airbag is inflated uselessly even when the rider is moved significantly inadvertently without prohibiting the operation of the inflator. Therefore, when mounting the wearing type airbag, it is contemplated that an impact sensor for detecting an impact force and an electronic control unit for emitting output signals when the impact force is determined to be excessive upon reception of detection signals from the impact sensor are provided on the small vehicle for activating the inflator of the wearing type airbag by the output signal from the electronic control unit. However, such an arrangement is complicated in structure.

SUMMARY AND OBJECTS OF THE INVENTION

In view of such circumstances, it is an object of an embodiment of the present invention is to provide an airbag apparatus for a small vehicle which can prevent the airbag from being inflated uselessly even when the rider is moved significantly on the vehicle. The airbag apparatus of the present invention is simple in structure.

In order to achieve the object an embodiment of the present invention, a first airbag module is provided that is mounted to a small vehicle that includes impact sensors for detecting an impact force, an electronic control unit for generating an output signal when the impact force is determined to be excessive upon reception of a detection signal from the impact sensors and an inflator which is activated by the output signal from the electronic control unit for generating high-pressure gas. An airbag is inflated by gas generated from the inflator for alleviating an impact to a rider. A second airbag module is provided that is worn by the rider that includes an inflator and a wearing type airbag which is inflated by gas generated by the inflator wherein the electronic control unit and the inflator of the second airbag module are connected by connecting means that can input the output signal from the electronic control unit to the inflator of the second airbag module.

The connecting means corresponds to an output coupler 15 and an input coupler 16 in a first embodiment of the present invention described later.

In addition to a first embodiment of the present invention is second embodiment includes delay means for transmitting the output signal from the electronic control unit to the inflator of the second airbag module with a certain time length of delay. The delay means is provided between the electronic control unit and the inflator of the second airbag module.

The delay means corresponds to a delay circuit 13 in the second embodiment of the present invention described later.

According to the first embodiment of the present invention, when the small vehicle receives an excessive impact force, the impact against the rider is effectively alleviated by the inflated airbag of the first airbag module on the vehicle. In addition, the impact against the rider can further be effectively alleviated by the inflated wearing type airbag of the second airbag module.

Further, since the second airbag module is adapted to be controlled in its activation by the impact sensor and the electronic control unit mounted on the small vehicle, even when the rider moves significantly with respect to the small vehicle, the second airbag module is prevented from erroneous activation. It is not necessary to provide a control unit specific for the second airbag module. Therefore, the structure can be simplified.

According to the second embodiment, a certain time length difference is provided for the inflation of both the airbags of the first and second airbag modules, whereby the inflation forces of the both airbags are exerted on the rider in sequence. Thus, the alleviation of the impact against the rider can be achieved effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to a preferred embodiment of the present invention illustrated in attached drawings, an embodiment of the present invention will be described below.

Figure 1:
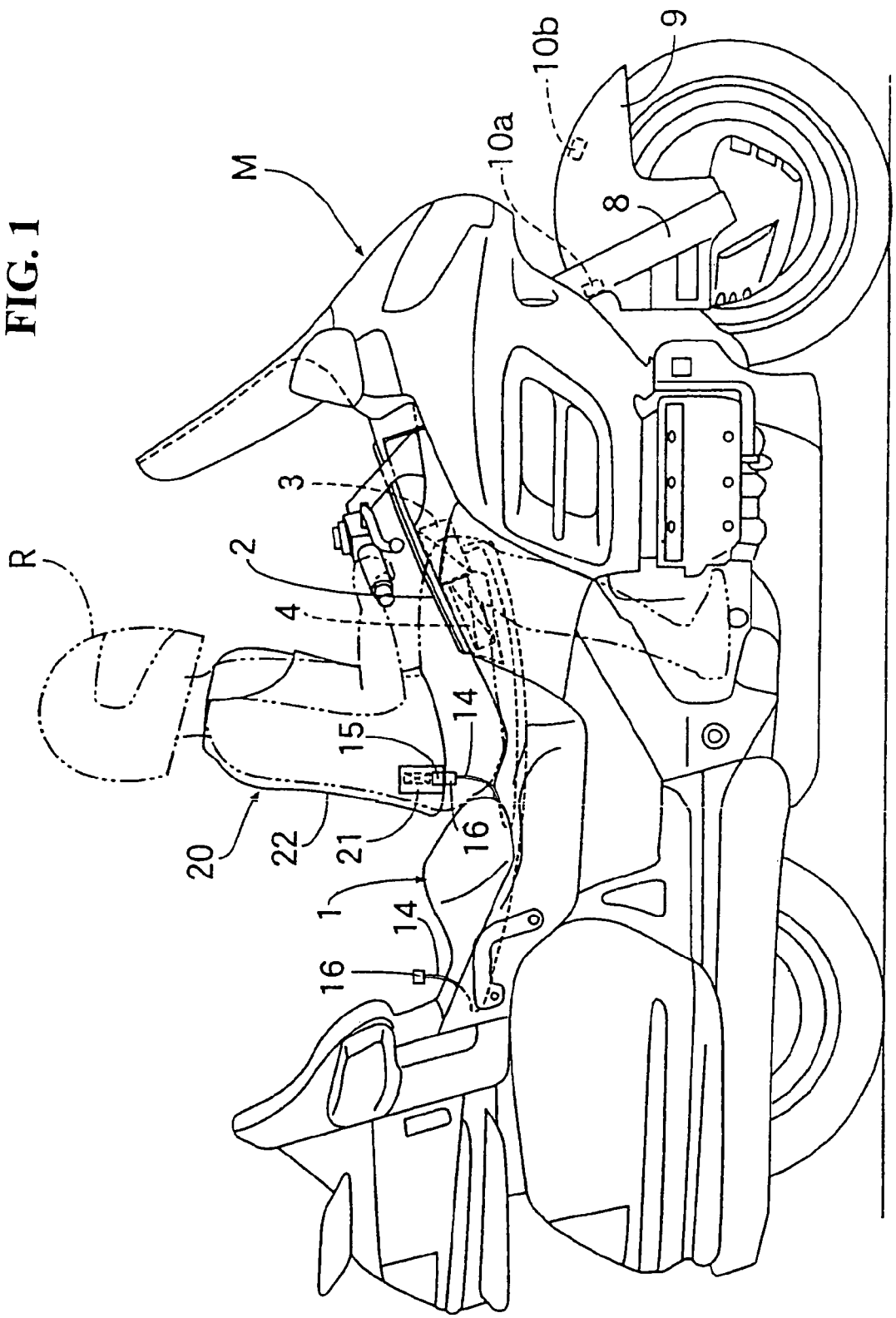
FIG. 1 is a side view of a motorcycle provided with an airbag apparatus according to the present invention with a rider being positioned thereon.
Figure 2:
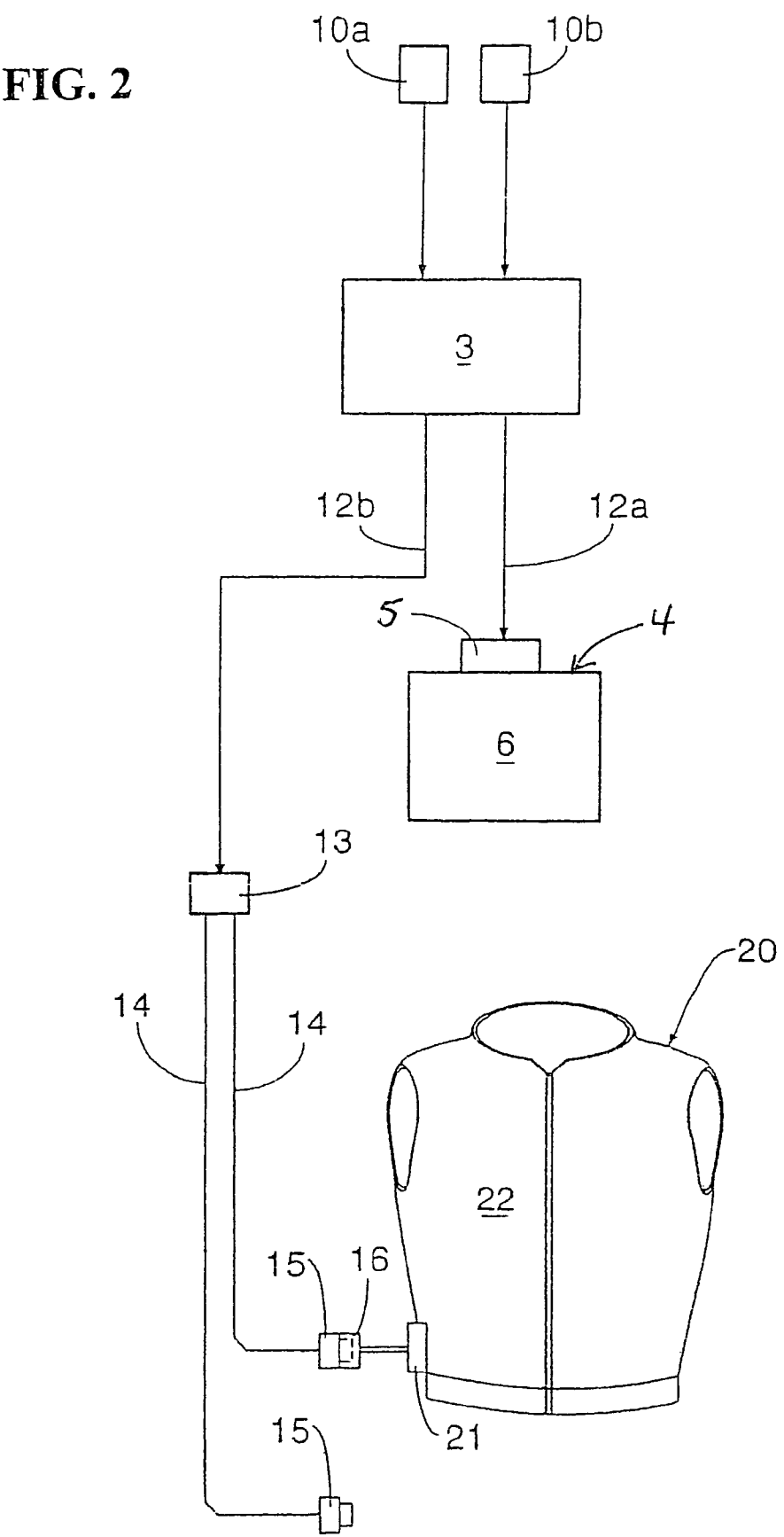
FIG. 2 is a circuit drawing of the airbag apparatus.

In FIGS. 1 and 2, a motorcycle M is a small vehicle that includes a tandem seat 1 for two riders. An electronic control unit 3 and a first airbag module 4 are disposed in an instrument panel 2 disposed immediately before the seat 1. The first airbag module 4 includes an inflator 5 for generating high-pressure gas upon activation as shown in FIG. 2. An airbag 6 is inflated by the gas generated from the inflator 5 for alleviating an impact against a rider R while constraining a posture of the rider R straddled on the seat 1.

Impact sensors 10a, 10b are provided for detecting an impact force and sending a detection signal according to the magnitude of the impact force to the electronic control unit 3. The impact sensors 10a, 10b are installed on a front fork 8 and a front fender 9 of the motorcycle M.

The electronic control unit 3 is adapted to emit an output signal when the impact force is excessive upon reception of the detection signals from the impact sensors 10a, 10b. First and second output signal lines 12a, 12b extend from the electronic control unit 3, the first output signal line 12a is connected to the inflator 5 of the first airbag module 4, and two signal conductors 14, 14 are connected to the second output signal line 12b via a delay circuit 13 with output couplers 15, 15 being attached to terminals of the signal conductors 14, 14. The delay circuit 13 transmits the output signal from the electronic control unit 3 to a second airbag module 20 side with a certain time length of delay. The certain time length of delay is set to an appropriate time length of delay considering a time length in which the rider R is considered to have fallen from the vehicle upon a collision of the motorcycle M or the like.

On the other hand, the rider R who is straddled on the seat 1 is provided with the second airbag module 20. The second airbag module 20 includes an inflator 21 for generating high-pressure gas upon activation with and a wearing type airbag 22 which is inflated by gas generated by the inflator 21. An input coupler 16 is attached to a signal input section of the inflator 21. The input coupler 16 can be coupled with one of the output couplers 15, 15 of the two signal conductors 14, 14, and the remaining output coupler 15 is stored in an adequate place on the motorcycle M for a fellow passenger.

Subsequently, the operation of this embodiment will be described.

Figure 3:
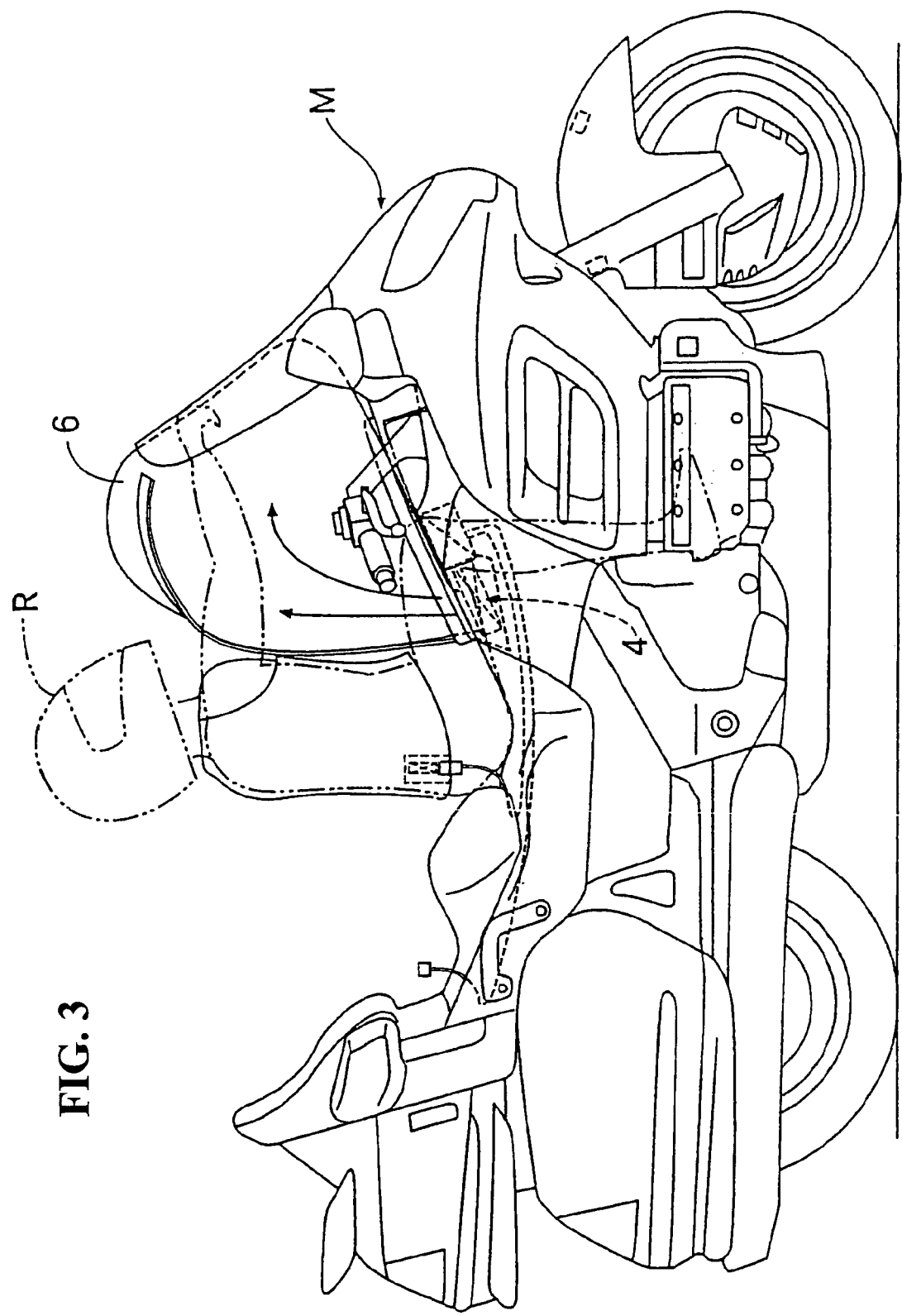
FIG. 3 is a drawing showing an operating state of a first airbag module in the same airbag apparatus corresponding to FIG. 1.
Figure 4:
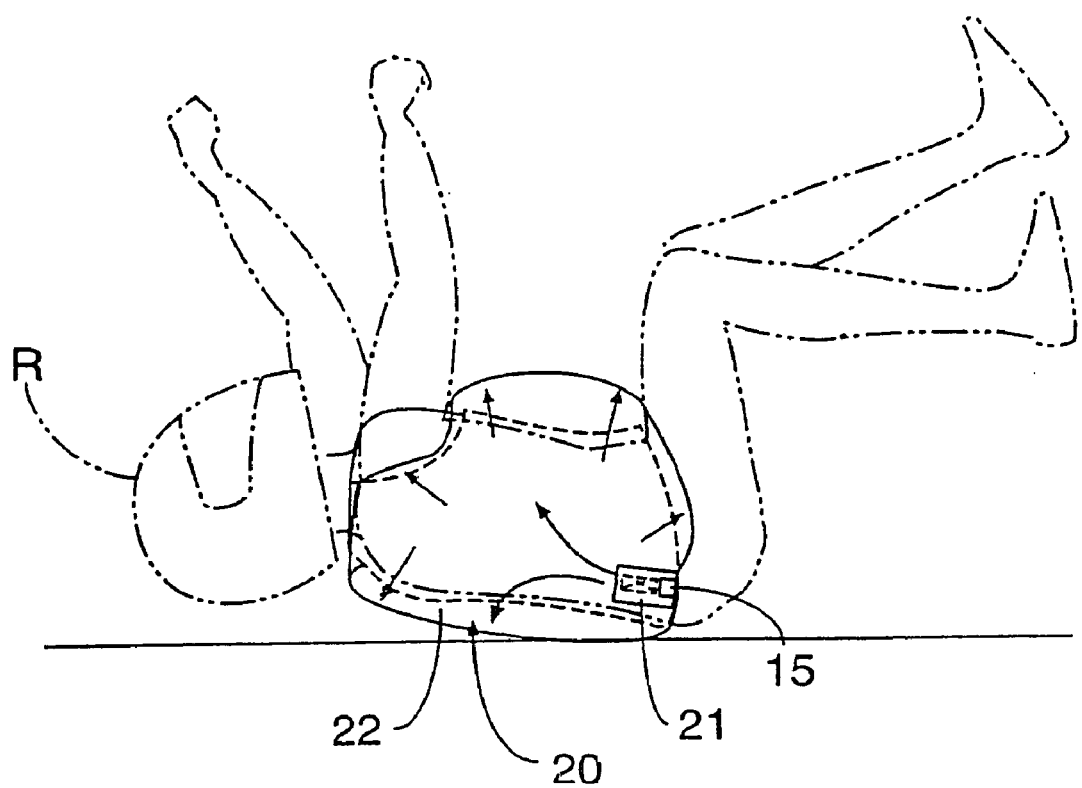
FIG. 4 is a side view of the rider showing an operating state of a second airbag module in the same airbag apparatus.

The rider R who is provided with the second airbag module 20 connects the output coupler 15 to the input coupler 16 when he/she straddles the seat 1 of the motorcycle M. When the plurality of impact sensors 10a, 10b detect an impact force due to a collision or the like and input the detection signal corresponding to the impact force to the electronic control unit 3 during operation of the motorcycle M, the electronic control unit 3 determines whether or not the impact force is excessive or not from the high-level input signal. When it is determined to be an excessive impact force, the electronic control unit 3 outputs an output signal to the first and second output signal lines 12a, 12b. Since the signal outputted to the first output signal line 12a is immediately input to the inflator 5 of the first airbag module 4, the inflator 5 is activated and generates a high-pressure gas and the airbag 6 presses the instrument panel 2 to be opened by the gas and is inflated in front of the rider R as shown in FIG. 3. Thus, the forward movement of the rider R is constrained, and the impact against the rider R can effectively be alleviated.

On the other hand, since the signal outputted to the first output signal line 12a is controlled to be delayed for a certain time length at the delay circuit 13 and then is entered to the inflator 21 of the second airbag module 20 through the signal conductors 14 and the output and input couplers 15, 16 in the connected state, the airbag 6 of the first airbag module 4 is inflated. Thereafter, the inflator 21 is activated to generate a high-pressure gas with a certain time length of delay. Then, the airbag 22 worn by the rider R is inflated by the generated gas. Therefore, even if the rider R falls from the vehicle after the occurrence of a collision or the like, the impact against the rider R who has fallen from the vehicle can be further effectively alleviated by the inflated airbag 22.

In addition, since the second airbag module 20 is adapted to be controlled in its activation by the impact sensors 10a, 10b and the electronic control unit 3 mounted on the motorcycle M, even though the rider R moves significantly with respect to the motorcycle M, the second airbag module 20 is prevented from being erroneous activated. Thus, it is not necessary to provide a control unit specific for the second airbag module 20, thereby achieving a simple structure.

Therefore, providing a certain time difference for inflation of both airbags 6, 22 means that the inflation forces of both airbags 6, 22 are applied to the rider R in sequence. Thus, the impact against the rider R effectively alleviated.

Although the embodiment of the present invention has been described thus far, the present invention is not limited to the above-described embodiment, and various modifications in design can be performed without departing the scope of the present invention. For example, the position of installation and the number of the impact sensors 10a, 10b may be selected arbitrarily. In addition, the present invention can also be applied to a scooter, a saddle type vehicle and a rider thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag apparatus for a vehicle comprising:
 a first airbag module adapted to be mounted on the vehicle comprising:
  impact sensors for detecting an impact force;
  an electronic control unit for generating an output signal when the impact force is determined to be excessive upon reception of a detection signal from the impact sensors;
  an inflator which is activated by the output signal from the electronic control unit for generating a high-pressure gas; and
  an first airbag mounted on the vehicle and adapted to be inflated by gas generated from the inflator for alleviating an impact to a rider; and
 a second airbag module adapted to be worn by a rider comprising:
  an inflator; and
  a wearing type second airbag adapted to be inflated by gas generated by the inflator;
 wherein the electronic control unit and the inflator of the second airbag module are connected by connecting means for inputting the output signal from the electronic control unit to the inflator of the second airbag module, and
 wherein a deployment of the inflator of the first airbag occurs first and a deployment of the inflator of the second airbag occurs second for providing sequential protection for the rider.

2. The airbag apparatus for a vehicle according to claim 1, and further including delay means for transmitting the output signal from the electronic control unit to the inflator of the second airbag module with a certain time length of delay, said delay means being provided between the electronic control unit and the inflator of the second airbag module, and wherein the first airbag of the first airbag module and the electronic control unit are operatively positioned in front of a seat of the vehicle, wherein the vehicle is a motorcycle.

3. The airbag apparatus for a vehicle according to claim 1, wherein the impact sensors include an impact sensor operatively mounted relative to each of a front fork and a front fender of a motorcycle.

4. An airbag apparatus for a vehicle comprising:
a first airbag module adapted to be mounted on the vehicle comprising:
at least one impact sensor for detecting an impact force;
an electronic control unit for generating an output signal when the impact force is determined to be excessive upon reception of a detection signal from the at least one impact sensor;
a first inflator activated by the output signal from the electronic control unit for generating a high-pressure gas; and
a first airbag adapted to be inflated by gas generated from the first inflator for alleviating an impact to a rider; and
a second airbag module adapted to be worn by a rider comprising:
a second inflator; and
a wearing type second airbag adapted to be inflated by gas generated by the inflator;
wherein the electronic control unit and the second inflator of the second airbag module are connected by connecting means for inputting the output signal from the electronic control unit to the inflator of the second airbag module,
and further including first and second signal conductors extending from said electronic control unit, the first signal conductor being operatively connected to the inflator of the first airbag and the second signal conductor being operatively connected to the inflator of the second airbag,
wherein at least the second conductor is a conductive wire with one end connected to the electronic control unit and a second end connected to the inflator of the second airbag via a delay circuit,
wherein a deployment of the first inflator of the first airbag occurs first and a deployment of the second inflator of the second airbag occurs second for providing sequential protection for the rider.

5. The airbag apparatus for a vehicle according to claim 4, wherein the signal outputted to the first signal conductor is immediately inputted to the inflator of the first airbag for deploying the first airbag.

6. The airbag apparatus for a vehicle according to claim 4, wherein the signal outputted to the second signal conductor is delayed for a predetermined time period and is then inputted to the inflator of the second airbag for deploying the second airbag, so that the second airbag cannot be deployed until after the first airbag is deployed.

7. The airbag apparatus for a vehicle according to claim 1, wherein the rider operatively, manually connects the connecting means for actuating the inflator of the second airbag upon a positioning of the rider on the vehicle.

8. The airbag apparatus for a vehicle according to claim 1, wherein the connecting means includes a first connection for connecting the rider to delay means via a first wire conductor and a second connection wire for connecting to a passenger to the delay means via a second wire conductor for providing a delayed actuation of the inflator of the second airbag worn by the rider and another inflator of another airbag worn by a passenger of the vehicle.

9. The airbag apparatus for a vehicle according to claim 1, and further including delay means for transmitting the output signal from the electronic control unit to the inflator of the second airbag module by a predetermined time period which is set considering a time length in which the rider falls from the vehicle after transmitting the output signal to the first airbag module.

10. An airbag apparatus for a vehicle comprising:
a first airbag module adapted to be mounted on the vehicle comprising:
at least one impact sensor for detecting an impact force;
an electronic control unit for generating an output signal when the impact force is determined to be excessive upon reception of a detection signal from the at least one impact sensor;
a first inflator activated by the output signal from the electronic control unit for generating a high-pressure gas; and
a first airbag adapted to be inflated by gas generated from the first inflator for alleviating an impact to a rider; and
a second airbag module adapted to be worn by a rider comprising:
a second inflator; and
a wearing type second airbag adapted to be inflated by gas generated by the inflator;
wherein the electronic control unit and the second inflator of the second airbag module are connected by connecting means for inputting the output signal from the electronic control unit to the inflator of the second airbag module,
wherein a deployment of the first inflator of the first airbag occurs first and a deployment of the second inflator of the second airbag occurs second for providing sequential protection for the rider.

11. The airbag apparatus for a vehicle according to claim 10,
wherein said delay means is provided between the electronic control unit and the second inflator of the second airbag module, and
wherein the first airbag and the electronic control unit of the first airbag module and the electronic control unit are operatively positioned in front of a seat of the vehicle,
wherein the vehicle is of a motorcycle.

12. The airbag apparatus for a vehicle according to claim 10, wherein the at least one impact sensor include an impact sensor operatively mounted relative to each of a front fork and a front fender of a motorcycle.

13. The airbag apparatus for a vehicle according to claim 10, and further including first and second signal conductors extending from said electronic control unit, the first signal conductor being operatively connected to the first inflator of the first airbag and the second signal conductor being operatively connected to the second inflator of the second airbag.

14. The airbag apparatus for a vehicle according to claim 13, wherein the signal outputted to the first signal conductor is immediately inputted to the first inflator of the first airbag for deploying the first airbag.

15. The airbag apparatus for a vehicle according to claim 10, wherein the signal outputted to the second signal conductor is delayed for a predetermined time period and is then inputted to the second inflator of the second airbag for deploying the second airbag, so that the second airbag worn by the rider cannot be deployed until after the first airbag is deployed.

16. The airbag apparatus for a vehicle according to claim 10, wherein the rider operatively, manually connects the connecting means for actuating the second inflator of the second airbag upon a positioning of the rider on the vehicle.

17. The airbag apparatus for a vehicle according to claim 10, wherein the connecting means includes a first connection for connecting the rider to delay means via a first wire conductor and a second connection wire for connecting to a passenger to the delay means via a second wire conductor for providing a delayed actuation of the inflator of the second airbag worn by the rider and another inflator of another airbag worn by a passenger of the vehicle.

18. The airbag apparatus for a vehicle according to claim 10, and further including delay means for transmitting the output signal from the electronic control unit to the inflator of the second airbag module by a predetermined time period which is set considering a time length in which the rider falls from the vehicle after transmitting the output signal to the first airbag module.

* * * * *